US012764057B2

(12) United States Patent
Kumar et al.

(10) Patent No.: US 12,764,057 B2
(45) Date of Patent: Oct. 13, 2026

(54) BACKUP SERVICE FUNCTION NOTIFICATION AND SYNCHRONIZATION

(71) Applicant: Juniper Networks, Inc., Sunnyvale, CA (US)

(72) Inventors: Rajneesh Kumar, Bangalore (IN); Peyush Gupta, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/452,536

(22) Filed: Oct. 27, 2021

(65) Prior Publication Data

US 2022/0150160 A1 May 12, 2022

Related U.S. Application Data

(60) Provisional application No. 63/110,830, filed on Nov. 6, 2020.

(51) Int. Cl.
*H04L 45/00* (2022.01)
*H04L 12/46* (2006.01)
(Continued)

(52) U.S. Cl.
CPC .......... *H04L 45/22* (2013.01); *H04L 12/4633* (2013.01); *H04L 45/306* (2013.01); *H04L 45/42* (2013.01); *H04L 67/10* (2013.01)

(58) Field of Classification Search
CPC ... H04L 45/306; H04L 12/4633; H04L 45/42; H04L 45/745; H04L 45/28; H04L 67/10;
(Continued)

(56) References Cited

U.S. PATENT DOCUMENTS 9,571,394 B1 * 2/2017 Sivaramakrishnan ........................ H04L 45/586
9,853,898 B1 * 12/2017 Subramanian .......... H04L 45/42
(Continued)

FOREIGN PATENT DOCUMENTS

CN 105591978 A 5/2016
CN 108702331 A 10/2018
(Continued)

OTHER PUBLICATIONS

Halpern, et al., "Service Function Chaining (SFC) Architecture," Internet Engineering Task Force, RFC 7665, Oct. 2015, 32 pp.
(Continued)

*Primary Examiner* — Chris Parry
*Assistant Examiner* — Dixon F Dabipi
(74) *Attorney, Agent, or Firm* — Shumaker & Sieffert P.A.

(57) ABSTRACT

Techniques are described for backup service function notification and synchronization. For example, a network system comprises: a plurality of service functions; a computing device comprising a service function classifier configured to: classify a packet to a service function chain including the plurality of service functions; determine backup service function(s) for an active service function of the service function chain; encapsulate the packet with a network service header, wherein the network service header includes backup service function information identifying one or more computing devices that host the backup service function(s); and send the packet encapsulated with the network service header to a computing device that hosts the active service function to enable the computing device that hosts the active service function to send, based at least on the backup service function information, state information for the active service function with the one or more backup service functions.

20 Claims, 7 Drawing Sheets

(51) Int. Cl.
*H04L 45/302* (2022.01)
*H04L 45/42* (2022.01)
*H04L 67/10* (2022.01)

(58) Field of Classification Search
CPC ....... H04L 67/55; H04L 67/563; H04L 67/63; H04L 69/22; H04L 45/22
See application file for complete search history.

(56) References Cited

U.S. PATENT DOCUMENTS

| | | | | |
|---|---|---|---|---|
| 9,923,815 | B2 | 3/2018 | Assarpour et al. | |
| 10,050,859 | B2 * | 8/2018 | Kim | H04L 41/0654 |
| 10,333,822 | B1 | 6/2019 | Jeuk et al. | |
| 2014/0105031 | A1 * | 4/2014 | McDysan | H04L 45/302 370/242 |
| 2015/0381493 | A1 * | 12/2015 | Bansal | H04L 45/741 370/392 |
| 2016/0119253 | A1 | 4/2016 | Kang et al. | |
| 2017/0093658 | A1 * | 3/2017 | Ryan | H04L 67/02 |
| 2017/0257310 | A1 * | 9/2017 | Patil | H04L 47/115 |
| 2017/0288998 | A1 * | 10/2017 | Kim | H04L 43/50 |
| 2017/0359252 | A1 * | 12/2017 | Kumar | H04L 12/4633 |
| 2018/0013638 | A1 * | 1/2018 | Guichard | H04L 45/50 |
| 2018/0091420 | A1 * | 3/2018 | Drake | H04L 45/306 |
| 2019/0036815 | A1 * | 1/2019 | Kancherla | H04L 67/10 |
| 2020/0007438 | A1 | 1/2020 | Patil et al. | |
| 2020/0274945 | A1 * | 8/2020 | Rolando | H04L 67/10 |
| 2022/0060370 | A1 * | 2/2022 | Gage | H04L 45/24 |

FOREIGN PATENT DOCUMENTS

| | | | | |
|---|---|---|---|---|
| CN | 109417556 | A | 3/2019 | |
| CN | 116530066 | A | 8/2023 | |
| KR | 20180039461 | A * | 4/2018 | H04L 47/728 |
| KR | 20180039461 | A1 | 4/2018 | |
| WO | WO-2021135420 | A1 * | 7/2021 | H04L 45/28 |

OTHER PUBLICATIONS

Quinn et al., “Network Service Header (NSH), ”Internet Engineering Task Force (IETF), RFC 8300, Jan. 2018, 40 pp.
Response to Extended Search Report dated Mar. 23, 2022, from counterpart European Application No. 21206783.9 filed Nov. 9, 2022, 25 pp.
Extended Search Report from counterpart European Application No. 21206783.9 dated Mar. 23, 2022, 9 pp.
First Office Action and Search Report, and translation thereof, from counterpart Chinese Application No. 202111304561.7 dated Jan. 30, 2024, 18 pp.
Hu et al., “Research on the architecture of address semantics-driven service function chaining”, Journal of Light Industry, vol. 35, No. 5, Sep. 1, 2020, 11 pp., URL: http://qgxb.zzuli.edu.cn/zzqgxb/cn/article/doi/10.12187/2020.05.010, Translation provided for only the Abstract.
Second Office Action from counterpart Chinese Application No. 202111304561.7 dated Nov. 20, 2024, 10 pp.
Notice of Intent to Grant and Text Intended to Grant from counterpart European Application No. 21206783.9 dated Feb. 19, 2025, 49 pp.
Notice of Intent to Grant, and translation thereof, from counterpart Chinese Application No. 202111304561.7 dated May 1, 2025, 8 pp.
Shang et al., “Reducing the Service Function Chain Backup Cost over the Edge and Cloud by a Self-adapting Scheme”, IEEE Transactions on Mobile Computing, IEEE, Jan. 1, 2021, 10 pp.
Extended European Search Report and Search Opinion received for European Application No. 21206783.9, mailed on Mar. 23, 2022, 9 pages.

* cited by examiner

| SPI | SI | NH | BACKUP SF NH |
|---|---|---|---|
| 10 | 3 | 203.0.113.1 | 203.0.113.3 |
| | | 203.0.113.2 | 203.0.113.3 |
| | | 203.0.113.3 | 203.0.113.1<br>203.0.113.2 |
| 20 | 12 | 192.0.2.1 | 192.0.2.10 |
| | | 192.0.2.2 | 192.0.2.10 |
| | | 192.0.2.10 | ROLE - BACKUP |
| 30 | 7 | 192.0.2.10 | SYNC NOT PERMITTED |
| | | 198.51.100.1 | SYNC NOT PERMITTED |

BACKUP SERVICE FUNCTION NOTIFICATION AND SYNCHRONIZATION

This application claims the benefit of U.S. Provisional Patent Application No. 63/110,830, filed on Nov. 6, 2020, which is hereby incorporated by reference herein in its entirety.

TECHNICAL FIELD

The disclosure relates to computer networks and, more specifically, to applying network services to data traffic traversing computer networks.

BACKGROUND

A computer network is composed of a set of nodes (e.g., computing devices) and a set of links that connect one node to another. For instance, a computer network may be composed of a set of routers while the set of links may be paths between the routers. When a first node in the network sends data traffic to a second node in the network, the message may pass through many links and many nodes. The set of links and nodes that the message passes through while traveling from the first node to the second node is referred to as a path through the network.

A network operator may deploy one or more computing devices to apply, to data traffic traversing a computer network, network services such as firewall, carrier grade network address translation (CG-NAT), performance enhancement proxies for video, transport control protocol (TCP) optimization and header enrichment, caching, and load balancing. Each of these network services may be referred to as a service function and is implemented by one or more service function instances. In addition, the network operator may configure service function chains that each identify a set of the service functions to be applied to packet flows mapped to the respective service function chains. A service function chain, in other words, defines one or more service functions to be applied in a particular order to provide a composite service for application to packet flows bound to the service function chain for processing. In this way, a service function chain is a sequence of service functions through which packet flows satisfying specified criteria will pass. An example service function chain architecture is described in Halpern, J., Ed. and C. Pignataro, Ed., "Service Function Chaining (SFC) Architecture", RFC 7665, October 2015, available at www.rfc-editor.org/info/rfc7665, which is incorporated by reference herein in its entirety.

SUMMARY

In general, techniques are described for backup service function notification and synchronization. For example, in a computer network that offers service functions, a service function classifier (e.g., an ingress to the service function overlay network) (also referred to herein as simply "classifier") may encapsulate, to a packet classified to a service function chain, a network service header to realize a service path along the service function chain. The network service header typically includes a service path identifier that uniquely identifies the service path and a service index that provides a location within the service path. As described herein, the service function classifier may further include backup service function information in the network service header such that an active service function next hop in the service function chain (referred to herein as "service function next hop") may use the backup service function information to identify the backup service functions with which to perform stateful synchronization.

In one example, the classifier may store a table including backup service function information such as one or more network addresses of computing devices that host backup service functions. When the classifier receives a packet classified to a service function chain, the classifier may determine, from a lookup of the table, the location of one or more backup service functions for the active service functions in the service function chain. The classifier may, in addition to specifying the service path identifier and a service index of the network service header, specify the location of one or more backup service functions in the network service header (e.g., one or more network addresses of computing devices that host the one or more backup service functions) and forward the packet to the service function next hop.

In response to receiving the packet, the service function next hop may use the backup service function information in the network service header to identify the one or more backup service functions with which to synchronize its session (e.g., flow state). In this way, by sending the packet with the network service header including the backup service function information, the classifier may leverage a packet in the data plane to facilitate stateful synchronization between an active service function and one or more backup service functions without the active service function needing to be statically configured by an orchestrator or network controller. This may provide switchover in the event the active service function fails or is otherwise unavailable without significant loss of functionality or data that would otherwise occur if an orchestrator or network controller is needed to statically configure the backup service function. This also enables the classifier to dynamically update the active service function with the backup service function next hop in situations such as a topological change resulting from a change or update of a backup service function. For example, if there is a change in backup service function (e.g., backup service function fails), the classifier may dynamically update the backup service function next hop by sending a subsequent packet with the updated backup service function information to enable a service function next hop to perform stateful synchronization with the computing devices that host the one or more backup service functions identified in the updated backup service function information.

In one example, the techniques described include a method comprising: receiving, by a computing device that hosts an active service function of a service function chain, a packet classified to the service function chain, wherein the packet is encapsulated with a network service header that includes backup service function information for the active service function of the service function chain; and sending, by the computing device and based at least on the backup service function information included in the network service header, state data for the active service function to one or more computing devices that host the one or more backup service functions.

In another example, the techniques described include a method comprising: classifying, by a service function classifier, a packet to a service function chain; determining, by the service function classifier, one or more backup service functions for an active service function of the service function chain; encapsulating, by the classifier, the packet with a network service header, wherein the network service header includes backup service function information identifying one or more computing devices that host the one or more backup service functions; and sending, by the classifier, the packet encapsulated with the network service header to a computing device that hosts the active service function in the service function chain to enable the computing device that hosts the active service function to send, based at least on the backup service function information, state data for the active service function with the one or more backup service functions.

In another example, the techniques described include a network system comprising: a plurality of service functions; a computing device comprising a service function classifier configured to: classify a packet classified to a service function chain including the plurality of service functions; determine one or more backup service functions for an active service function of the service function chain; encapsulate the packet with a network service header, wherein the network service header includes backup service function information identifying one or more computing devices that host the one or more backup service functions; and send the packet encapsulated with the network service header to a computing device that hosts the active service function in the service function chain to enable the computing device that hosts the active service function to synchronize, based at least on the backup service function information, state information for the active service function with the one or more backup service functions.

The details of one or more example of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
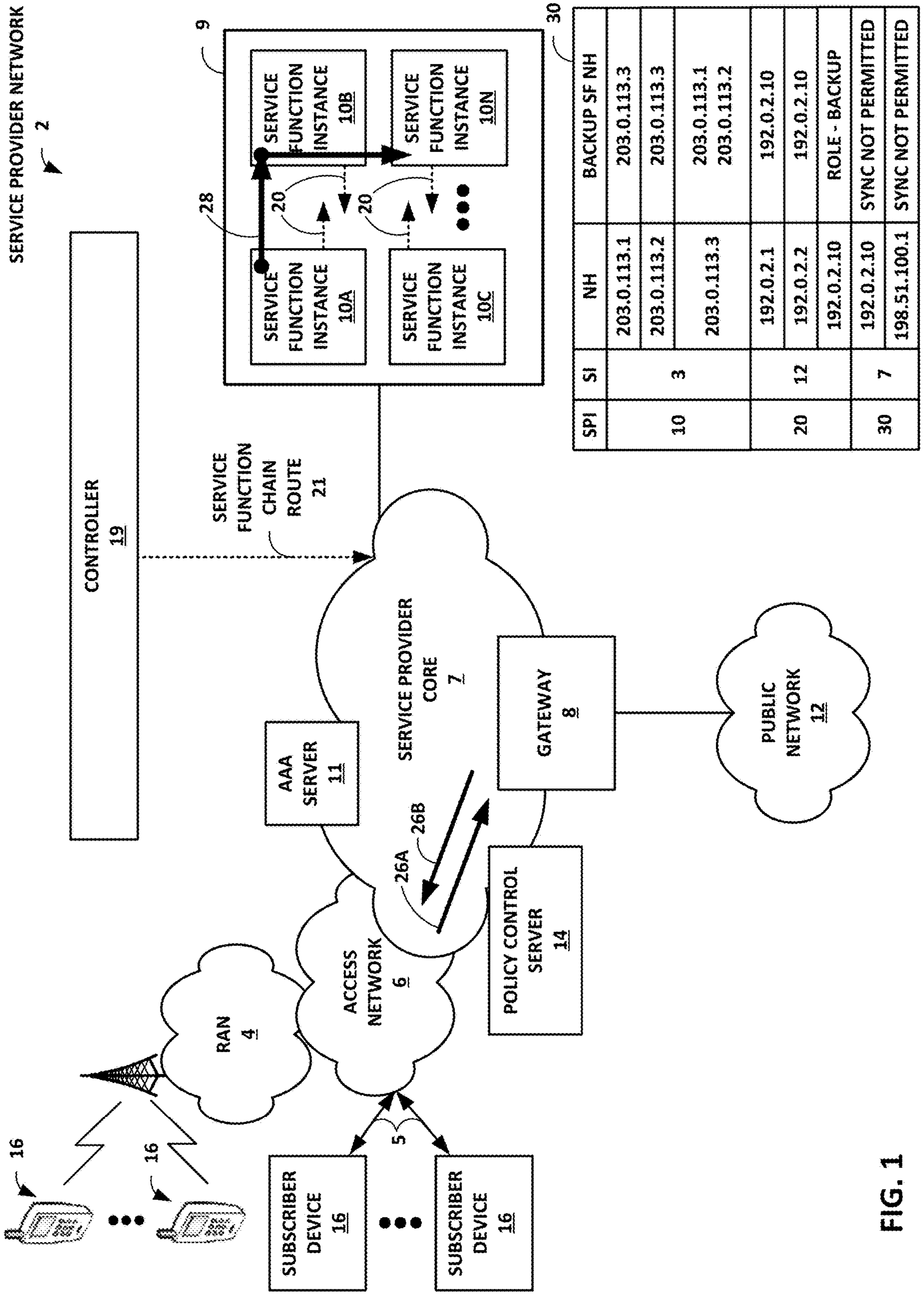
FIG. 1 illustrates an example network system providing backup service function notification and synchronization, in accordance with techniques described herein.

FIG. 1 illustrates an example network system providing backup service function notification and synchronization, in accordance with techniques described herein. The example network system of FIG. 1 includes a service provider network 2 to provide packet-based network services to subscriber devices 16 (collectively, "subscriber devices 16"). That is, service provider network 2 provides authentication and establishment of network access for subscriber devices 16 such that the subscriber devices may begin exchanging data packets with public network 12 (also referred to herein as a "packet data network"), which may be an internal or external packet-based network such as the Internet.

In the example of FIG. 1, service provider network 2 comprises access network 6 ("access network 6") that provides connectivity to public network 12 via service provider core network 7 (referred to herein as "core network 7") and gateway 8. Service provider core network 7 and public network 12 provide packet-based services that are available for request and use by subscriber devices 16. As examples, core network 7 and/or public network 12 may provide, for example, bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples include networks conforming to a Universal Mobile Telecommunications System (UMTS) architecture, 5$^{th}$ Generation of Mobile Technologies (5G), an evolution of UMTS referred to as Long Term Evolution (LTE), mobile IP standardized by the Internet Engineering Task Force (IETF), as well as other standards proposed by the 3$^{rd}$ Generation Partnership Project (3GPP), 3$^{rd}$ Generation Partnership Project 2 (3GGP/2) and the Worldwide Interoperability for Microwave Access (WiMAX) forum.

Service provider core network 7 offers packet-based connectivity to subscriber devices 16 attached to access network 6 for accessing public network 12. Core network 7 may represent a network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent an edge network coupled to core network 7, e.g., by a customer edge device such as customer edge switch or router (not shown in FIG. 1). Public network 12 may include a data center.

In examples of service provider network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of service provider network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

A network service provider that administers at least parts of service provider network 2 typically offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by public network 12, and such packets traverse gateway 8 as part of at least one packet flow. Flows 26A illustrated in FIG. 1 represent one or more upstream packet flows from any one or more subscriber devices 16 and directed to public network 12. Flows 26B represent one or more downstream packet flows from public network 12 and directed to any one or more subscriber devices 16.

The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by values used in a header of a packet, such as the network "5-tuple," i.e., a source network address (IP address), destination network address, source port, destination port, and protocol, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services. The techniques described in this disclosure may apply to packet flows between any two computing devices and are not limited to application to flows 26 depicted in FIG. 1.

As described herein, service provider network 2 includes a services complex 9 having service function instances 10A-10N that provide an execution environment for the network services. That is, each of service function instances 10 apply one or more service functions. A service function is applied to received packets of packet flows and can act at various layers of a protocol stack (e.g., network layer, application layer).

As examples, service functions applied by service function instances 10 may include firewall and security services, carrier grade network address translation (CG-NAT), media optimization (voice/video), WAN optimization, NAT44, NAT64, HTTP header enrichment functions, TCP optimizers, IPSec/VPN services, deep packet inspection (DPI), HTTP filtering, counting, accounting, charging, and load balancing of packet flows or other types of services applied to network traffic. Service functions may be alternately referred to as virtualized network functions (VNFs), although service functions need not be virtual. Each of service function instances 10 in this way represents an instance of a service function. Each of service function instances 10 represents a component that may be realized as a virtual element of a computing device (e.g., a real server) and/or embedded in a physical network element (e.g., a firewall or NAT appliance). Multiple service function instances 10 may be executed in a single computing device or physical network element computing device. A computing device that hosts one or more service function instances 10 may refer to a real server or a physical network element.

Although illustrated as part of a services complex 9, which may represent a data center, service function instances 10 may, for instance, be located within core network and be interconnected by one or more switches or virtual switches of core network 7. Service function instances 10 may in some instances be located in multiple different data centers. One or more service function instances 10 may be located within an enterprise/customer site attached to service provider core 7. In some examples, each of service function instances 10 may be executed by a virtual machine in virtual compute environment. Moreover, the compute environment may comprise a scalable cluster of general computing devices, such as x86 processor-based servers. As another example, service function instances 10 may be executed by a combination of general purpose computing devices and special purpose appliances. As virtualized, individual network services provided by service function instances 10 can scale just as in a modern data center, through the allocation of virtualized memory, processor utilization, storage and network policies, as well as horizontally by adding additional load-balanced virtual machines. Services complex 9 may represent or otherwise be implemented using a public cloud, private cloud, hybrid cloud, or combination thereof. Other network architectures for delivering network traffic to services complex 9 are contemplated, and the techniques are not limited to network service provider architectures as illustrated in FIG. 1.

In example of FIG. 1, gateway 8 steers individual packet flows 26 through a defined set of service functions provided by service function instances 10. That is, each packet flow may be forwarded through a particular ordered combination of service functions, each ordered combination providing an overall "network service" or "composite service" and being referred to herein as a "service function chain" or, more simply, a "service chain." A service function chain may include a particular service function instance 10 that provides the service function or may indicate that the service function may be applied by any service function instance 10 that provides the service function. In this way, packet flows 26 may be processed by service function instances 10 as the packets flow between access network 6 and public network 12 according to service function chains configured by the service provider. A particular service function instance 10 may support multiple service function chains. An example service chain 28 is depicted in FIG. 1 and includes, in order, service function instance 10A, service function instance 10B, and service function instance 10N.

Whereas a "service function chain" defines one or more services to be applied in a particular order to provide a composite service for application to packet flows bound to the service function chain, a "service tunnel" or "service path" refers to a logical and/or physical path taken by packet flows processed by a service function chain along with the forwarding state for forwarding packet flows according to the service function chain ordering. Each service function chain may be associated with a respective service path.

Gateway 8 or one or more computing devices hosting service function instances 10 may classify packet flows 26 to service function chains. Classification granularity may vary based on device capabilities, customer requirements, service provider network policies, and services offered. Initial classification determines the service function chain with which to process a packet flow. Subsequent classification may occur within a service function chain to alter the sequence of service functions applied.

Service function instances 10 may implement each service function chain using internally configured forwarding state that directs packets of the packet flow along a service function chain for processing according to the identified set of service function instances 10. Such forwarding state may specify tunnel interfaces for tunneling between service function instances 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. Tunnel encapsulation for service function chaining may be referred to as service function chain encapsulation, which enables the creation of the service function chain in the data plane of service provider network 2. In some instances, real or virtual switches, routers or other network elements that interconnect service function instances 10 may be configured to direct packet flows to the service function instances 10 according to service function chains.

Service function chain encapsulation enables forwarding between service function instances 10 that provide a service function overlay network over a physical underlay network, the physical underlay network made up of an existing layer 3 network topology of computing devices, such as real servers, interconnected by routing and switching equipment for exchanging packetized data between the computing devices. The service function overlay network may enable the network service provider to create paths between service function instances 10 and to locate service functions in service provider network 2 in a network topology-independent manner, e.g., without requiring changes to the underlay network topology.

Computing devices that implement service function instances 10 may distribute service function data that describes service function instances 10. As one example, computing devices may leverage a layer 3 routing protocol, such as a Border Gateway Protocol (BGP) message (e.g., BGP UPDATE message) to distribute service function data. More particularly, a computing device that hosts at least one service function instance 10 may output a service function instance route 20. In general, a service function instance route (SFIR) describes a particular service function instance of a particular service function and the way to forward a packet to the service function instance through the underlay network. For example, service function instance route 20 may include a network address for the computing device and service function instance data that specifies, for one or more service function instances 10 hosted by the computing device, a service function type for the service function and a service identifier (e.g., as defined by IANA (Internet Assigned Numbers Authority)), where the combination of the service function type and the service identifier identify the service function instance 10 in the service provider network 2. The service function instance routes 20 may in some instances specify an address family for the service function instance data that varies from the address family of the underlay computer network and, in this way, the service function instance routes 20 distribute service function data for an overlay network of service function instances 10 overlaying the computer network made up of computing devices.

In some cases, a service function instance route 20 may be originated by the computing device that hosts the described service function instance 10. However, service function instance routes 20 may be originated by controller 19 or other another device. A service function instance route 20 includes a network address, such as an IPv4 or IPv6 address, for the computing device that hosts the service function instances 10 being described. In some example, the service function instance route 20 may further include encapsulation data that describes the tunnel encapsulation for packets to be received by the computing device in order to reach the service function instances 10.

In FIG. 1, controller 19 may manage deployment of service function instances within the operating environment of services complex 9. For example, controller 19 may orchestrate a service function and deploy the service function as a service function instance, e.g., any of service function instances 10. In some examples, controller 19 may orchestrate a virtual machine, container, or other operating environment to host the orchestrated service function. Controller 19 may orchestrate service functions in response to requests from applications or network service provider operators.

In some examples, controller 19 may distribute service function chain data that describes overlay topologies for service function chains each made up of one or more service function instances 10 described by the service function chain data. As one example, controller 19 may leverage a layer 3 routing protocol to output, to service provider network 2, a service function chain route 21 that includes an ordered set of one or more service function instances 10 to define a service chain with which to process at least one packet flow 26. Controller 19 may inject the service function chain route 21 into service provider network 2 by sending the service function chain route 21 to any of service function instances 10, a route reflector, or another routing device of service provider network 2, for advertisements by the routing device in the network. Controller 19 may be a layer 3 routing protocol speaker and advertise service function chain route 21 directly. Controller 19 may output multiple service function chain routes, service function chain route 21 being only one example. In general, controller 19 originates one service function chain route per service function chain, and each service function chain route may include a service path identifier for the service function chain described, a sequence of service function types and/or service function instances of which the chain consists, and for each such service function type and/or service function instance, a service index that represents it in the service function chain described.

Controller 19 may receive service function instance routes 20 via the layer 3 protocol. Controller 19 may use service function instance data included in service function instance routes 20 to generate a service function chain and the service function chain route 21 for the service function chain. For example, controller 19 may receive a request from an operator to create a service function chain that has a series of service functions (each with a different service function type) for application to a packet flow. Controller 19 may identify service function instances that match the service function types for the service functions, as indicated in the service function instance routes 20. Additional examples of the service function instance route and service function chain route are described in U.S. patent application Ser. No. 15/368,282, entitled "Distributed Service Function Chain Data and Service Function Instance Data in a Network," filed Dec. 2, 2016, the entire contents of which is incorporated by reference herein. The use of layer 3 routing protocols to distribute service function chain data is merely one example and controller 19 may use any protocol to distribute service function data and/or service function chain data, such as Network Configuration protocol (NETCONF).

In the example of FIG. 1, service function instance 10A may operate as an ingress service function instance for the service function overlay network to apply a classification service function to packet flows. In such cases, service function instance 10A may be referred to as a "classifier," which is a special service function located at an ingress point to a service function overlay network. In such instances, service function instance 10A operating as a classifier assigns the packets of a given packet flow to a specific service function chain. To classify a packet flow for processing using a service function chain, service function instance 10A may apply policies to packet header fields (e.g., 5-tuple values such as source/destination address, source/destination port, protocol) of the packet flow packets to determine the service chain for the packet. Policies may be specific to a subscriber of a subscriber device 16, specific to a network, or specific to an application service transported using the packet flow, for instance. A policy may specify a service path identifier that identifies the service function chain for processing packets that match the policy. In some cases, service function instance 10A operating as a classifier selects a service function chain for a packet flow, sets the service path identifier for the service function chain, sets the service index for the first hop in the selected service function chain, and adds to packets of the packet flow a network service header (NSH) indicating the service path identifier and the service index. Additional examples of the network service header are described in P. Quinn, Ed., et al., "Network Service Header (NSH)," Request for Comments (RFC) 8300, January 2018, the entire contents of which is incorporated by reference herein.

In the example of FIG. 1, service function instance 10A may classify one or more of packet flows 26 to service function chain 28. Although service function instance 10A is the first service function instance in service function chain 28, service function instance 10A may classify some packets flows 26 to service function chains that do not have service function instance 10A as the first service function instance. In addition, a computing device other than one of service function instances 10 may classify packet flows to service function chains and direct the packet flows to first service function instances 10 in the service function chains.

To apply the service functions indicated by a service function chain, service function instances 10 forward a packet through an ordered combination of service function instances 10 for application of corresponding service functions. A service function instance 10 that applies a service function to a packet determines a next service function instance 10 in a service function chain and forwards the packet to a next service function instance 10 (referred to herein as a "service function next hop"). In some examples, the service function next hop may be determined based on next hop information for the service chain, such as a service path identifier and service function type that in combination identify a service function instance as a next service function instance in the service chain. For example, service function instance 10A may add a network service header (NSH) to the packet, the NSH including at least one of the service path identifier and the service index.

The packet with the NSH may be further encapsulated in a tunnel encapsulation header including an IP address in the underlay network for the computing device that hosts the service function next hop, e.g., service function instance 10B. As one example, the tunnel encapsulation header may be based on encapsulation data included in a service function instance route 20 for service function instance 10B. If more than one service function instance 10 may be used as the next service function instance for a service function in a service function chain, then an anycast address in the underlay network or direct knowledge of the underlay network topology may be used to select the next service function instance 10 to apply the indicated service function.

Service function instance 10B receives the packet and applies its corresponding service function to the packet to further realize service function chain 28. The computing device that hosts service function instance 10B uses the NSH included with the packet to determine a next service function instance 10 in the service chain and, in some cases, a next service index. For example, the combination of the service path identifier and the service index provides the identification of a service function and its order within the service function chain. In this example, the computing device that hosts service function instance 10B determines the next service function instance is service function instance 10N and forwards the packet to the computing device that hosts service function instance 10N.

Service function instance 10N receives the packet and applies its corresponding service function to the packet to further realize service function chain 28. The computing device that hosts service function instance 10N uses the NSH included with the packet to determine a next service function instance 10 in the service chain. In this case, service function instance 10N is a terminal service function instance in service chain 28. The computing device that hosts service function instance 10N may therefore output the packet to the IP next hop for the packet in the underlay network.

To provide a high availability of service functions, service functions may be deployed in a cluster as part of the same service function chain or across multiple service function chains. Service functions in the cluster may be configured as active service functions and/or backup service functions for a given service function chain. For example, service function chain 28 may include a first service function (e.g., firewall) provided by service function instance 10A, a second service function (e.g., Network Address Translation) provided by service function instance 10B, and a third service function (e.g., WAN optimization) provided by service function instance 10N. In the example of FIG. 1, service function instance 10C may also provide a Network Address Translation and may operate as a backup service function in the event service function instance 10B fails or is otherwise unavailable. Typically, a controller statically configures the active service function and backup service function. For example, a network operator may pre-configure, for a given service function chain, the active service function and one or more backup service functions for the active service function. However, service function instances in the cluster may change and the controller may be unable to dynamically update the backup service functions in such topological changes.

In accordance with the techniques described in this disclosure, service provider network 2 provides backup service function notification and synchronization. In the example of FIG. 1, when service function instance 10A, operating as the classifier, receives a packet and classifies the packet to service function chain 28, service function instance 10A determines whether there are any backup service functions for the active service functions in service function chain 28. For example, service function instance 10A may store a table, e.g., table 30, that includes backup service function information. In the example of FIG. 1, table 30 includes network addresses of computing devices that host backup service functions for active service functions of a given service path. In this example, service chain 28 may be identified by a service path identifier (SPI) "10". The location of the network service for which backup service function information is being provided is indicated by the service index (SI) "3". The backup service function information specifies a network address of an active service function next hop and one or more network addresses of backup service function next hops for the active service function of the given service function chain. In this example, the backup service function information for service chain 28 at the location indicated by service index 3 includes an active service function next hop located at 203.0.113.1 and its backup service function next hop located at 203.0.113.3. In this example, the backup service function information for service chain 28 at the location indicated by service index 3 includes another active service function next hop located at 203.0.113.2 and its backup service function next hop located at 203.0.113.3. Traffic may be load balanced among active service functions.

In some examples, the backup service function information specifies network addresses of a plurality of backup service function next hops for an active service function. In this example, backup service function information for service chain 28 at the location indicated by service index 3 includes another active service function next hop located at 203.0.113.3 and a first backup service function next hop located at 203.0.113.1 and a second backup service function next hop located at 203.0.113.2. Table 30 is only one example of a data structure storing backup service function information and may include additional information, such as metric information. In some examples, controller 19 may push active and backup service functions stored in table 30. In other examples, table 30 may be generated based on the service function instance data such as data distributed with service function instance routes 20 and/or service function chain information included in service function chain route 21.

When the classifier, e.g., service function instance 10A, receives a packet and has classified the packet to service function chain 28 with service path identifier of 10 in this example, service function instance 10A performs a lookup of table 30 to determine whether there are any backup service functions for the active service function instances in service function chain 28. Service function instance 10A may include backup service function information (e.g., a network address of the computing device hosting a backup service function instance) in the network service header. For example, service function instance 10A encapsulates the packet with a network service header including the service path identifier "10," the service index "3," and an address of the computing device hosting backup service function instance 10C (e.g., 203.0.113.3) and sends the packet encapsulated with the network service header to the service function next hop, e.g., service function instance 10B that is an active service function. In some examples, the classifier may include the backup service function information in the network service header during initialization or when the backup service function information is updated or changed.

In response to receiving the packet, the service function next hop may use the backup service function information in the network service header to identify the backup service functions with which to synchronize its session (e.g., flow state). For example, in response to receiving the network service header including the backup service function information, service function instance 10B may synchronize a NAT session with service function instance 10C identified by the backup service function information. As one example, a computing device that hosts the active service function may establish a communication session (e.g., TCP or UDP session) with the computing device that hosts the backup service function such that the active service function may synchronize state information with the backup service function. In this way, by sending the packet with the network service header including the backup service function information, the classifier may leverage a packet in the data plane to provide stateful synchronization between an active service function and a backup service function without the backup service function information needing to be statically configured by a controller, e.g., in the computing device hosting the classifier or the prior service function in the service function chain. By synchronizing the service function state data for packet flows, the active service function and backup service function may enable low-latency switchover to the backup service function because the backup service function has similar state as the active service function and can assume stateful processing of flows previously being processed by the active service function.

In some examples, a backup service function may change for a given service function chain. For example, the backup service function for active service function 10B of service function chain 28 may change from service function instance 10C to service function 10D (not shown in FIG. 1). In this example, service function instance 10A, operating as the classifier, may add a network service header including updated backup service function information that identifies service function 10D such that the service function next hop (e.g., service function instance 10B) may use the updated backup service function information included in the network service header to perform stateful synchronization.

Figure 2:
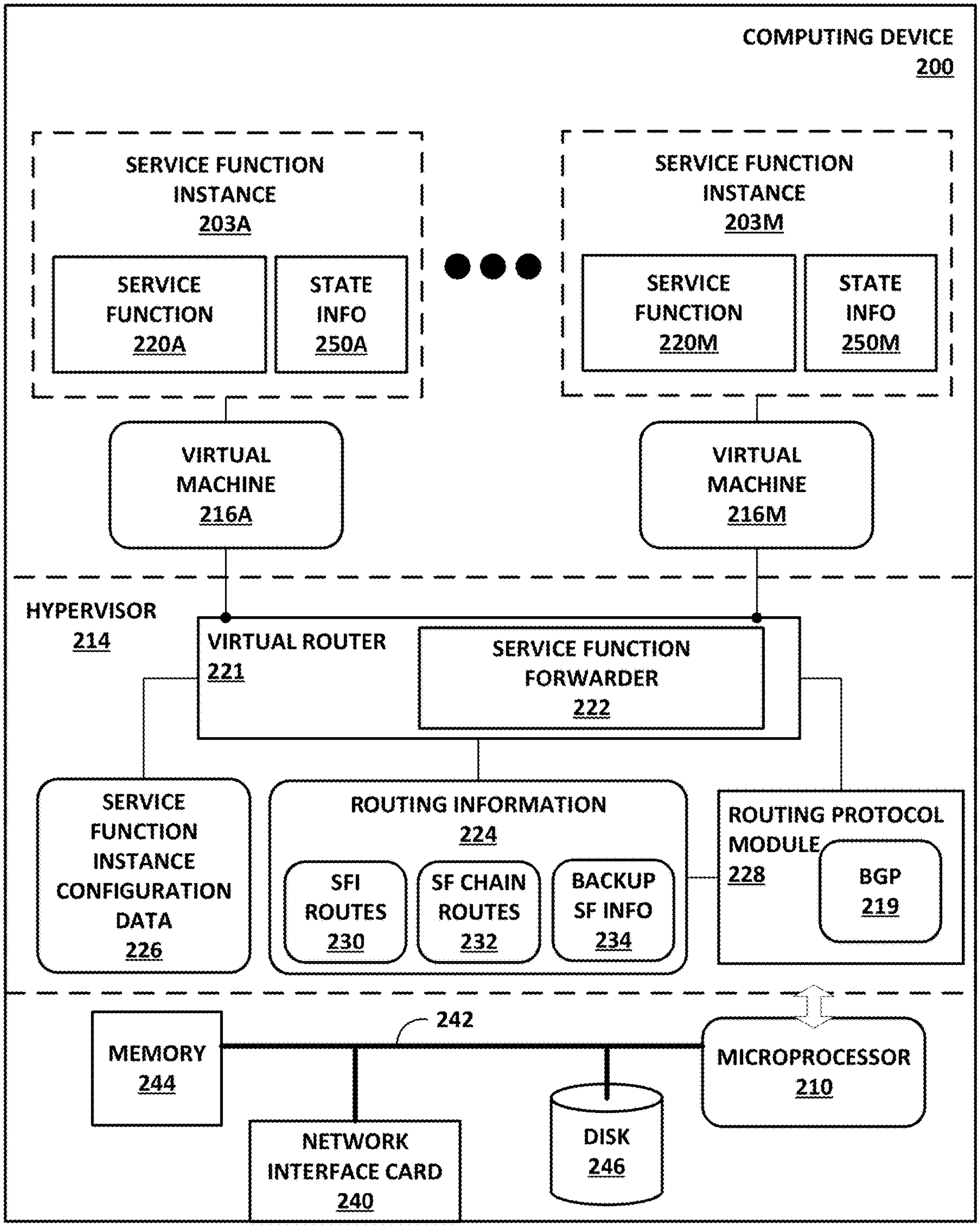
FIG. 2 is a block diagram illustrating an example computing device that provides one or more service function instances, in accordance with the techniques described in this disclosure.

FIG. 2 is a block diagram illustrating an example computing device that provides one or more service function instances according to techniques described in this disclosure. Computing device 200 may represent a real or virtual server and includes in this example, a system bus 242 coupling hardware components of a computing device 200 hardware environment. System bus 242 couples memory 244, network interface card (NIC) 240, storage disk 246, and microprocessor 210. Network interface card 240 includes one or more interfaces configured to exchange packets using links of an underlying physical network. Microprocessor 210 may include one or more processors each including an independent execution unit to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 244 provides a physical address space composed of addressable memory locations.

Memory 244, NIC 240, storage disk 246, and microprocessor 210 provide an operating environment for a software stack that executes a hypervisor 214 and one or more virtual machines 216A-216M (collectively, "virtual machines 216"). While illustrated and described with respect to virtual machines, service function instances 203A-203M (collectively, "service function instances 203") may be executed by other operating environments, such as containers (e.g., a DOCKER container). An operating system kernel (not shown in FIG. 2) may execute in kernel space and may include, for example, a Linux, Berkeley Software Distribution (BSD), another Unix-variant kernel, or a Windows server operating system kernel, available from Microsoft Corp.

Computing device 200 executes a hypervisor 214 to manage virtual machines 216. Example hypervisors include Kernel-based Virtual Machine (KVM) for the Linux kernel, Xen, ESXi available from VMware, Windows Hyper-V available from Microsoft, and other open-source and proprietary hypervisors.

Virtual machines 216 host corresponding service function instances 203. Each of service function instances 203 may represent an example instance of a service function instance 10 of FIG. 1. In some examples, a virtual machine 216 may host one or more service function instances 203. Service function instances 203 are described hereinafter with respect to service function instance 203A. Service function instance 203 includes service function 220A for application to packet flows. Some examples of computing device 200 host only one service function instance 203.

Service function 220A represents software that may apply any one of the aforementioned service functions described above with respect to service function instances 10. Service function instance 203A may be orchestrated by a controller, such as controller 19, to be executed by virtual machine 216A to apply service function 220A. Service function instance configuration data 226 includes data describing service function instance 203A. Service function instance configuration data 226 may specify the service function type of service function 220A and a service identifier for service function instance 203A, for example. Service function instance configuration data 226 may further describe a virtual machine tap or other identifier for virtual machine 216A that enables virtual router 221 to direct received packets to virtual machine 216A for processing using service function instance 203A.

Hypervisor 214 in the example computing device 200 provides an operating environment for a routing protocol module 228, which may represent a process that executes various protocols at different layers of a network stack. In the example of FIG. 2, network protocols include the Border Gateway Protocol (BGP) 219, which is a layer 3 routing protocol. BGP 219 may include Multiprotocol BGP (MP-BGP). Routing protocol module 228 may execute other protocols not shown in FIG. 2, such as an MPLS label distribution protocol and/or other MPLS protocols. Routing protocol module 228 is responsible for the maintenance of routing information 224 to reflect the current topology of a network to which computing device 200 is connected via NIC 240. In particular, BGP 219 updates routing information 224 to accurately reflect the topology of the network and other entities based on routing protocol messages received by computing device 200.

Routing protocol module 228 uses BGP to send and receive service function routes that distribute service function instance data and service function chain data for describing service function overlay network nodes and topology. Routing protocol module 228 may receive one or more service function instance (SFI) routes 230 and one or more service function chain routes 232 and store the service function routes to routing information 224. Service function instance routes 230 and service function chain routes 232 may represent instances of service function instance routes 20 and service function chain route 21, respectively, of FIG. 1.

Routing protocol module 228 may generate and output service function instance routes 230 to advertise service function instances 203 of computing device 200. That is, routing protocol module 228 may originate such service function instance routes 230. For example, routing protocol module 228 may obtain, for service function instance 203A, the service function type of service function 220A and the service identifier for service function instance 203A from service function instance configuration data 226. Routing protocol module 228 may generate a service function instance route from the service function type and service identifier and output the service function instance route via network interface card 240.

Virtual router 221 of hypervisor 214 may manage one or more virtual networks configured for computing device 200, such as an overlay network for service function instances 203. Additional description of a virtual router is found in U.S. Pat. No. 9,571,394, filed Mar. 26, 2014, which is incorporated by reference herein in its entirety. Packets received by the network interface card 240, for instance, from an underlying physical network may include an outer header to allow the physical network to tunnel the payload or "inner packet" to a physical network address for NIC 240 of computing device 200 that executes the virtual router 221. The outer header may include not only a physical network address of NIC 240 of the computing device but also a network service header. Aspects of virtual router 221 may be executed in user space rather than in hypervisor 214. For instances, aspects of virtual router 221 including aspects of service function forwarder 222 may be executed by virtual machines 216.

Service function forwarder 222 provides a service function data plane and determines forwarding of packets according to service function chains. In some examples, computing device 200 may include a separate instance of service function forwarder 222 for each service function instance 203. Service function forwarder 222 may be executed in part, in some examples, by specialized hardware designed to support virtual networking. Service function forwarder 222 may be executed by an application in user space rather than in hypervisor 214.

Service function forwarder 222 may be conceptualized as a portal in the underlay network through which service function instances 203 may be reached. Note that while service function forwarder 222 and routing protocol module 228 are illustrated and described as separate modules, operations of routing protocol module 228 to import and export and process routes, e.g., may be considered control plane operations of service function forwarder 222. In addition, as used herein, the term "service function forwarder" may refer to computing device 200 as a whole as such operations relate to service function route import/export/selection, packet forwarding in the service overlay network, and so forth, but excluding the operations of service function instances 203.

When service function forwarder 222 receives a service function chain route, service function forwarder 222 may determine whether to import the service function chain route based on the route target. If the service function forwarder 222 imports the route, the service function forwarder 222 may determine whether it is on the described service function chain by determining whether a route distinguisher for computing device 200 is specified for any of the service indices/hops of the service function chain. If so, the service function forwarder 222 may create forwarding state for incoming packets and forwarding state for outgoing packets that have been processed by one of service function instances 203.

The service function forwarder 222 may create local forwarding state making the association between the service path identifier/service index and a specific service function instance as identified by the route distinguisher for the service function instance route and service type combination. The service function forwarder 222 may also create next hop forwarding state for packets received back from the local service function instance 203 that need to be forwarded to the next hop in the service function chain. There may be a choice of next hops. The service function forwarder 222 may install forwarding state for all potential next hops, or may make choices and only install forwarding state to a subset of the potential next hops. The installed forwarding state may change over time reacting to changes in the underlay network and the availability of particular service function instances 203. Note that service function forwarder 222 may only create and store forwarding state for the service function chain on which it is included, in some cases. That is, service function forwarder 222 may not maintain state for all service function chains advertised.

This selection of forwarding state includes determining from the service function chain route the service index to put in the network service header of the outbound packet. This selection may be conditional on information returned from the local service function instance 203. A service function forwarder 222 may also install forwarding state to support looping, jumping, and branching.

Network interface card 240 receives packets of packet flows. The packet flows may be classified to a service function chain that includes service function instance 203A. A packet received by network interface card 240 may include a tunnel encapsulation header that identifies the packet for processing by service function forwarder 222. Service function forwarder 222 may remove the tunnel encapsulation header. A packet to be processed by service function forwarder 222 and received from a previous service function instance (executed by computing device 200 or another computing device) may include a network service header having a service path identifier and a service index.

The service function forwarder 222 may determine service function instance 203A is to apply service function 220A to the packet, based on the network service header. For example, the service function forwarder 222 may determine the service function chain route 232 having a matching service path identifier and key the service index from the network service header to determine service function instance 203A is indicated for the service index. The service function instance 203A may be indicated for the service index in the matching service function chain route 232 using a combination of service function type and service identifier that identify the service function instance 203A. The service function instance in some cases may be indicated by the service function type only, the service function type corresponding to at least one of service functions 220. For instance, the service function instance may be indicated by the service function type only if the service identifier indicates that any service function instance that supports the service function type may apply the service function. In example instances of computing device 200 in which there is an instance of a service function forwarder 222 per service function instance 203 (e.g., only one service function forwarder 222 and one service function instance 203), the service function forwarder 222 may direct its corresponding service function instance 203 to apply a service function to a received packet without first having to determine the particular service function instance 203 to apply the service function.

Service function forwarder 222 may direct service function instance 203A to process the packet based in part on the network service header. Service function instance 203A processes the packet by applying service function 220A. In addition to or as part of processing the packet by applying the service function 220A, service function instance 203A may determine a new network service header for the packet. That is, service function instance 203A may select the next service function instance along the service chain (or another service chain) that is to process the packet. Service function 203A may select between multiple service function instances (in some cases of different service function types). The service index and service path identifier in the new network service header may indicate the next service function in the service chain, a previous service function in the chain (known as "looping"), or a service function further down the chain (known as "jumping"). The service index and service path identifier in the new network service header may alternatively indicate a service function on a different service function chain (known as "branching").

Service function forwarder 222 subsequently selects a service function instance that provides the service function denoted by the service path identifier and service index in the next network service header, and service function forwarder 222 forwards the packet to the service function forwarder that supports the selected service function instance.

The service index in the new network service header received from service function instance 203A may leave the service function forwarder 222 with a choice of next hop service function types, and service function instances for each service function types. That is, the service index indicates a set of one or more entries in the service function chain route 232 for the service path identifier, each of which corresponds to a service function type and the service identifier (e.g., route distinguisher) of a service function instance route 230 that advertised a specific service function instance. The service function forwarder 222 selects one of these service function instances, identifies the service function forwarder that supports the chosen service function instance, and sends the packet to that next hop service function forwarder. Additional examples of computing device 200 processing the packet for a service function next hop is described in U.S. patent application Ser. No. 15/368,282, which was incorporated by reference above.

In accordance with the techniques described in this disclosure, a service function instance 203 operating as a classifier may add a network service header including backup service function information. In this example, service function instance 203A may operate as a service function classifier. Service function instance 203A may classify a packet to a service function chain. To notify active service functions in the service function chain of their backup service functions, service function instance 203A encapsulates a network service header including backup service function information.

For example, service function instance 203A may determine, from backup service function information 234, one or more backup service functions for the active service functions of the service function chain. Backup service function information 234 may represent a table (e.g., table 30 of FIG. 1) including backup service function information. Computing device 200 may perform a lookup of backup service function information 234 to identify one or more backup service functions for an active service function of a given service chain.

In response to determining one or more backup service functions for the active service functions of the service function chain, service function instance 203A encapsulates the received packet with a network service header including the location of one or more backup service functions determined from backup service function information 234, and forwards the packet to a service function next hop to enable the service function next hop synchronize its state information with its backup service functions.

For example, assume network interface card 240 of computing device 200 receives a packet from a previous service function instance (e.g., the classifier executed by another computing device 200) that is encapsulated with a network service header including backup service function information. Service function forwarder 222 processes the packet and may determine that a service function instance hosted by another computing device may apply a service function as a backup for service function instance 203A. In this example, service function instance 203A may send state information 250A to the other computing device that hosts the backup service function to synchronize its state with the backup service function. If the network service header includes a plurality of backup service functions, the service function instance 203A may send state information 250A to each of the computing devices that host the backup service functions to synchronize its forwarding state with each of the backup service functions.

Figure 3A:
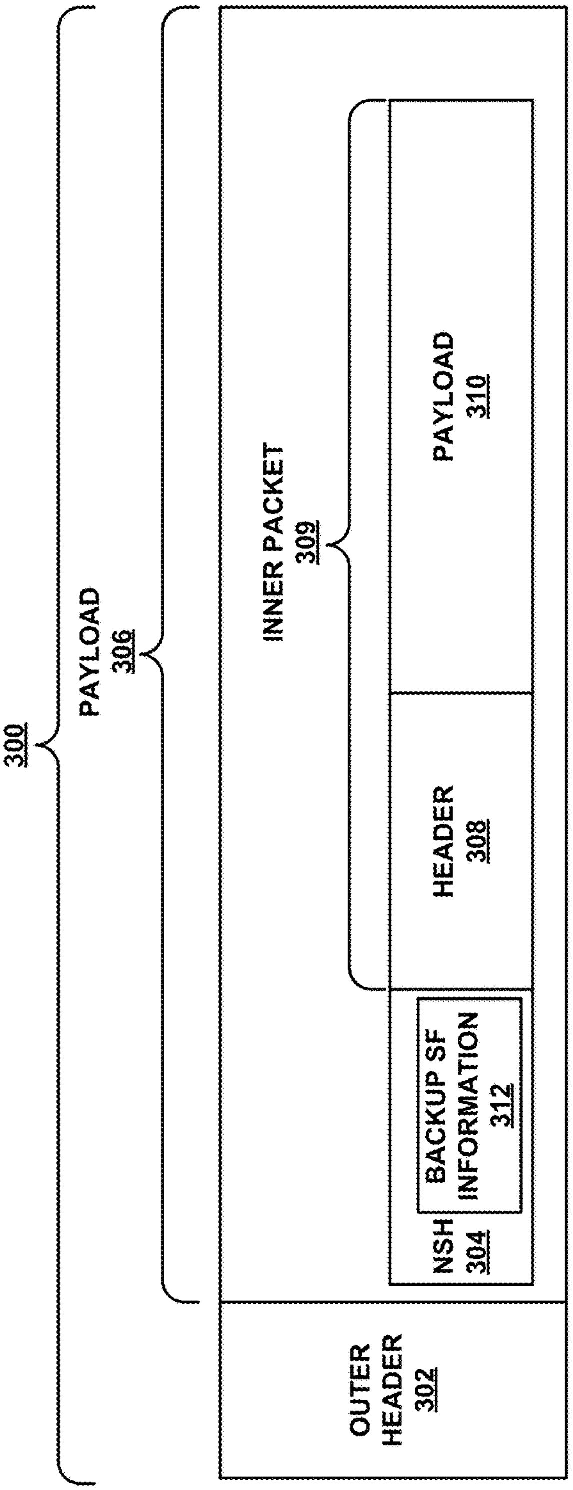
FIGS. 3A-3B are block diagrams illustrating an example tunnel packet to steer an inner packet along a service function chain and a network service header including backup service function information, in accordance with techniques described in this disclosure.
Figure 3B:
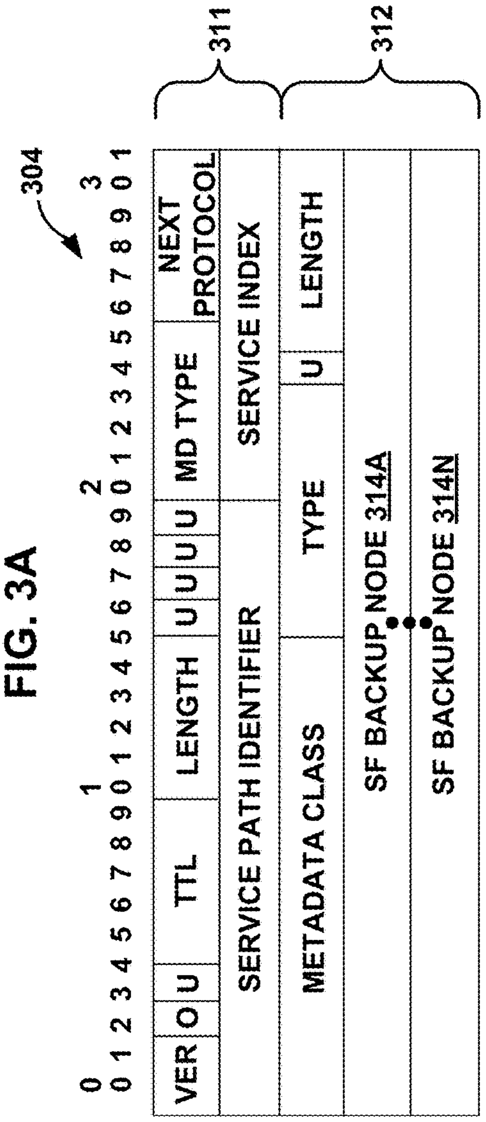

FIGS. 3A-3B illustrate an example tunnel packet and a network service header, respectively, in accordance with techniques of this disclosure. FIG. 3A illustrates an example tunnel packet to steer an inner packet along a service function chain, in accordance with techniques of this disclosure. In the example of FIG. 3A, an original inner packet 309 having header 308 and payload 310 is encapsulated with a network service header 304 and encapsulated as payload 306 using outer (or encapsulation) header 302 to form tunnel packet 300.

Outer header 302 may include tunnel encapsulation data advertised in encapsulation attributes 314 or otherwise included in service function instance routes. Outer header 302 enables the underlay network to forward tunnel packet 300 to a computing device that hosts a service function instance identified in network service header 304. As further described in FIG. 3B, network service header 304 may include a base header 311 including information to realize a service function path. For example, network service header 304 may include a service path identifier and a service index.

In accordance with the techniques described in this disclosure, network service header 304 may further include backup service function information 312. A service function classifier that receives a packet classified to a service function chain may add network service header 304 including a service path identifier, a service index, and backup service function information.

A computing device that receives tunnel packet 300 may determine a service function instance hosted by the computing device to process the inner packet 309, based on a service function instance route stored by the computing device that describes the service function chain identified by the network service header 304. The computing device may also determine from the backup service function information 312 included in the network service header 304 one or more computing devices that host one or more backup service functions for the service function instance hosted by the computing device.

FIG. 3B is an example of the network service header 304 in greater detail. For example, network service header 304 includes a base header 311 (otherwise referred to as "NSH Service Path Header") to realize a service path and backup service function information 312. Base header 311 includes at least a service path identifier that identifies a service function chain. In some examples, network service header 304 may include a service path identifier and another service function chain identifier that in combination identify a service function chain. Network service header 304 may further include a service index that identifies a next service function in the service function chain to be applied. Base header 311 may also include other information, such as a metadata type (illustrated as "MD TYPE" in FIG. 3B) to indicate that network service header 304 includes one or more variable-length context headers that, in accordance with the techniques described in this disclosure, include backup service function information, such as one or more network addresses of computing devices that host backup service functions, e.g., service function backup nodes 314A-314N (collectively, "backup service function nodes 314").

As one example, the variable-length context header may include fields such as a metadata class, type, an unassigned bit, the length of the variable-length metadata, and the variable-length metadata that specify the one or more network addresses of computing devices that host backup service functions. The metadata class may define the scope of the type field. The type field may specify the type of metadata being carried. The length field may specify the length of the variable-length metadata. As one particular example, the variable-length context header may specify a metadata class of 0x0000, which is a type that may be assigned by the Internet Assigned Numbers Authority (IANA) to specify the base NSH metadata class, and a value for the metadata type that indicates the network service header includes backup service function information.

A service function instance operating as a classifier (e.g., service function instance 10A of FIG. 1) may add a packet including network service header 304 including backup service function information 312, and forward the encapsulated packet to a service function next hop such that the service function next hop may perform stateful synchronization with the computing devices identified by service function backup nodes 314.

Figure 4:
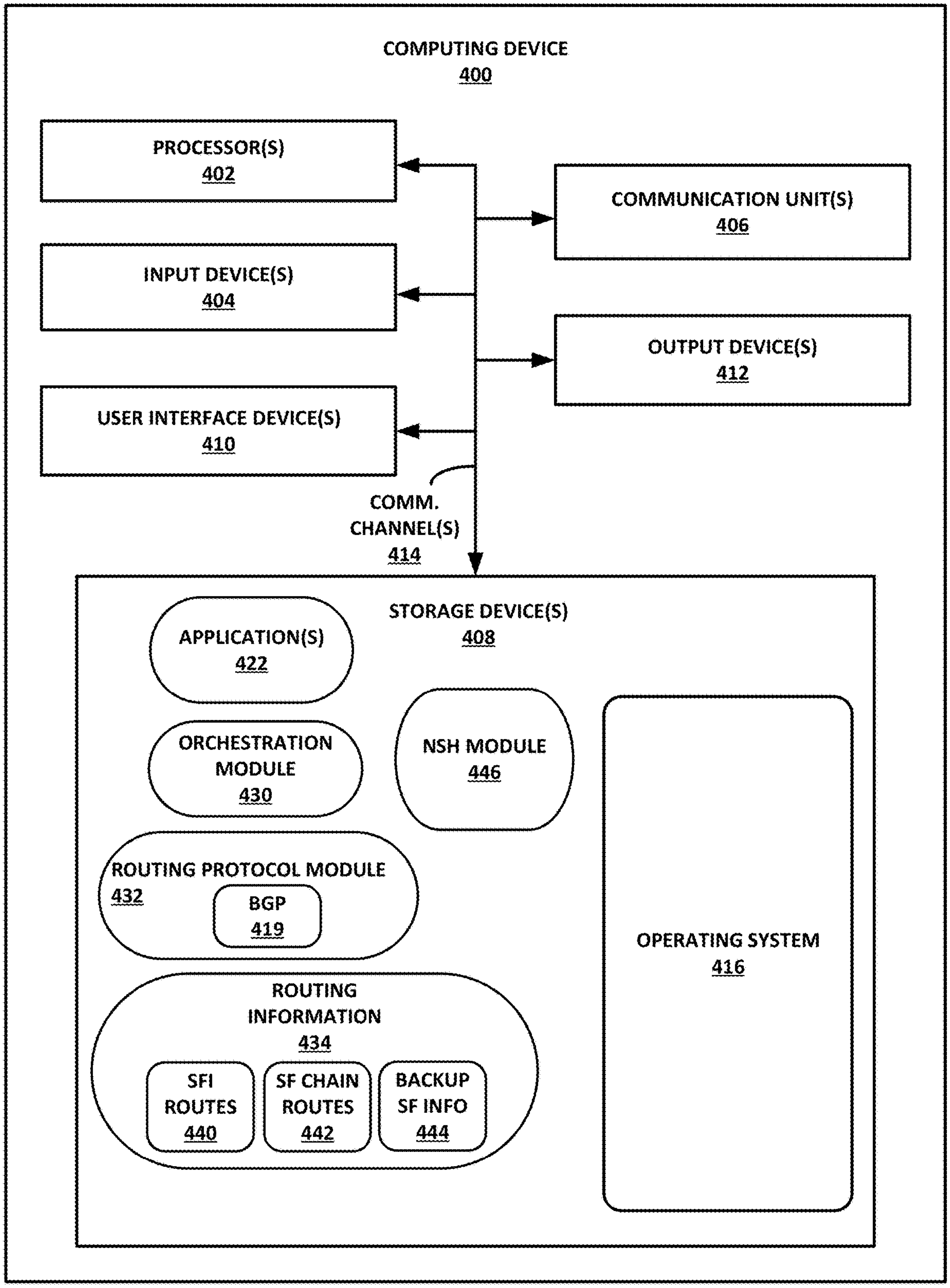
FIG. 4 is a block diagram illustrating further details of one example of a computing device that operates in accordance with one or more techniques of the present disclosure.

FIG. 4 is a block diagram illustrating further details of one example of a computing device that operates in accordance with one or more techniques of the present disclosure. FIG. 4 may illustrate a particular example of a server or other computing device 400 that includes one or more processor (s) 402 for executing any one or more of controller 19, service function instances 10, or any other computing device described herein. Other examples of computing device 400 may be used in other instances. Although shown in FIG. 4 as a stand-alone computing device 400 for purposes of example, a computing device may be any component or system that includes one or more processors or other suitable computing environment for executing software instructions and, for example, need not necessarily include one or more elements shown in FIG. 4 (e.g., communication units 406; and in some examples components such as storage device(s) 408 may not be co-located or in the same chassis as other components).

As shown in the specific example of FIG. 4 computing device 400 includes one or more processors 402, one or more input devices 404, one or more communication units 406, one or more output devices 412, one or more storage devices 408, and user interface (UI) device 410, and communication unit 406. Computing device 400, in one example, further includes one or more applications 422, orchestration module 430, routing protocol module 432, operating system 416 that are executable by computing device 400. Computing device 400 further includes routing information 434. Each of components 402, 404, 406, 408, 410, and 412 are coupled (physically, communicatively, and/or operatively) for inter-component communications. In some examples, communication channels 414 may include a system bus, a network connection, an inter-process communication data structure, or any other method for communicating data. As one example, components 402, 404, 406, 408, 410, and 412 may be coupled by one or more communication channels 414.

Processors 402, in one example, are configured to implement functionality and/or process instructions for execution within computing device 400. For example, processors 402 may be capable of processing instructions stored in storage device 408. Examples of processors 402 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 408 may be configured to store information within computing device 400 during operation. Storage device 408, in some examples, is described as a computer-readable storage medium. In some examples, storage device 408 is a temporary memory, meaning that a primary purpose of storage device 408 is not long-term storage. Storage device 408, in some examples, is described as a volatile memory, meaning that storage device 408 does not maintain stored contents when the computer is turned off. Examples of volatile memories include random access memories (RAM), dynamic random access memories (DRAM), static random access memories (SRAM), and other forms of volatile memories known in the art. In some examples, storage device 408 is used to store program instructions for execution by processors 402. Storage device 408, in one example, is used by software or applications running on computing device 400 to temporarily store information during program execution.

Storage devices 408, in some examples, also include one or more computer-readable storage media. Storage devices 408 may be configured to store larger amounts of information than volatile memory. Storage devices 408 may further be configured for long-term storage of information. In some examples, storage devices 408 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication units 406. Computing device 400, in one example, utilizes communication units 406 to communicate with external devices via one or more networks, such as one or more wired/wireless/mobile networks. Communication units 406 may include a network interface card, such as an Ethernet card, an optical transceiver, a radio frequency transceiver, or any other type of device that can send and receive information. Other examples of such network interfaces may include wireless mobile network technology (e.g., 3G, LTE, 5G) and WiFi radios. In some examples, computing device 400 uses communication unit 406 to communicate with an external device.

Computing device 400, in one example, also includes one or more user interface devices 410. User interface devices 410, in some examples, are configured to receive input from a user through tactile, audio, or video feedback. Examples of user interface devices(s) 410 include a presence-sensitive display, a mouse, a keyboard, a voice responsive system, video camera, microphone or any other type of device for detecting a command from a user. In some examples, a presence-sensitive display includes a touch-sensitive screen.

One or more output devices 412 may also be included in computing device 400. Output device 412, in some examples, is configured to provide output to a user using tactile, audio, or video stimuli. Output device 412, in one example, includes a presence-sensitive display, a sound card, a video graphics adapter card, or any other type of device for converting a signal into an appropriate form understandable to humans or machines. Additional examples of output device 412 include a speaker, a cathode ray tube (CRT) monitor, a liquid crystal display (LCD), or any other type of device that can generate intelligible output to a user.

Computing device 400 may include operating system 416. Operating system 416, in some examples, controls the operation of components of computing device 400. For example, operating system 416, in one example, facilitates the communication of one or more applications with processors 402, communication unit 406, storage device 408, input device 404, user interface devices 410, and output device 412.

Orchestration module 430 may orchestrate service function instances in a service function overlay network and generate service function chains. A network service provider operator may configure the service function chains using user interface devices 410 and/or input devices 404.

Routing protocol module 432 may represent a process that executes various protocols at different layers of a network stack. In the example of FIG. 4, network protocols include the Border Gateway Protocol (BGP) 419, which is a layer 3 routing protocol. BGP 419 may include Multiprotocol BGP (MP-BGP). Routing protocol module 432 may execute other protocols not shown in FIG. 4, such as an MPLS label distribution protocol and/or other MPLS protocols. Routing protocol module 432 is responsible for the maintenance of routing information 434 to reflect the current topology of a network to which computing device 400 is connected via one of communication units 406. In particular, BGP 419 updates routing information 434 to accurately reflect the topology of the network and other entities based on routing protocol messages received by computing device 400.

Routing protocol module 432 uses BGP to send receive service function routes that distribute service function instance data and service function chain data for describing service function overlay network nodes and topology. Routing protocol module 432 may receive one or more service function instance routes 440 and may receive one or more service function chain routes 442 and store the service function routes to routing information 434. Service function instance routes 440 and service function chain routes 442 may represent instances of service function instance routes 20 and service function chain route 21 of FIG. 1.

Using service function instance routes 440 received or generated by computing device 400, routing protocol module 432 may generate and output service function chain routes 442 to advertise service function chains configured for a service function overlay network controlled at least in part by computing device 400. That is, routing protocol module 432 may originate such service function chain routes 442 and inject the routes into the service function overlay network.

In accordance with the techniques described herein, computing device 400 includes a network service header module 446 to provide backup service function notification and synchronization. In an example in which processor(s) 402 of computing device 400 execute a service function instance operating as a service function classifier (e.g., an ingress to the service function overlay network such as service function instance 10A of FIG. 1), network service header module 446 may store backup service function information 444 (e.g., in routing information 434). In some examples, network service header module 446 may generate backup service function information based on service function instance routes 440 and service function chain routes 442. In other examples, network service header module 446 may receive backup service function information from a controller. As described above, backup service function information 444 may include network addresses of computing devices that host backup service functions.

Network service header module 446 may determine one or more backup service functions for an active service function of a service chain. For example, in response to receiving a packet and classifying the packet to a service chain, network service header module 446 may determine one or more backup service functions resulting from a lookup of backup service function information 444. Network service header module 446 may encapsulate the packet with a network service header including backup service function information 444. For example, the network service header may include a service path identifier, a service index, and one or more network addresses (e.g., IP addresses) of computing devices that host one or more backup service functions, such as the network service header illustrated in FIGS. 3A and 3B.

In the example in which processor(s) 402 of computing device 400 execute a service function instance that receives a packet encapsulated with a network service header including backup service function information (e.g., service function instance 10B of FIG. 1), the network service module 446 may identify the one or more computing devices that host one or more backup service functions from the network service header information and send state information of computing device 400 to the computing devices identified from the backup service function information included in the network service header.

Figure 5:
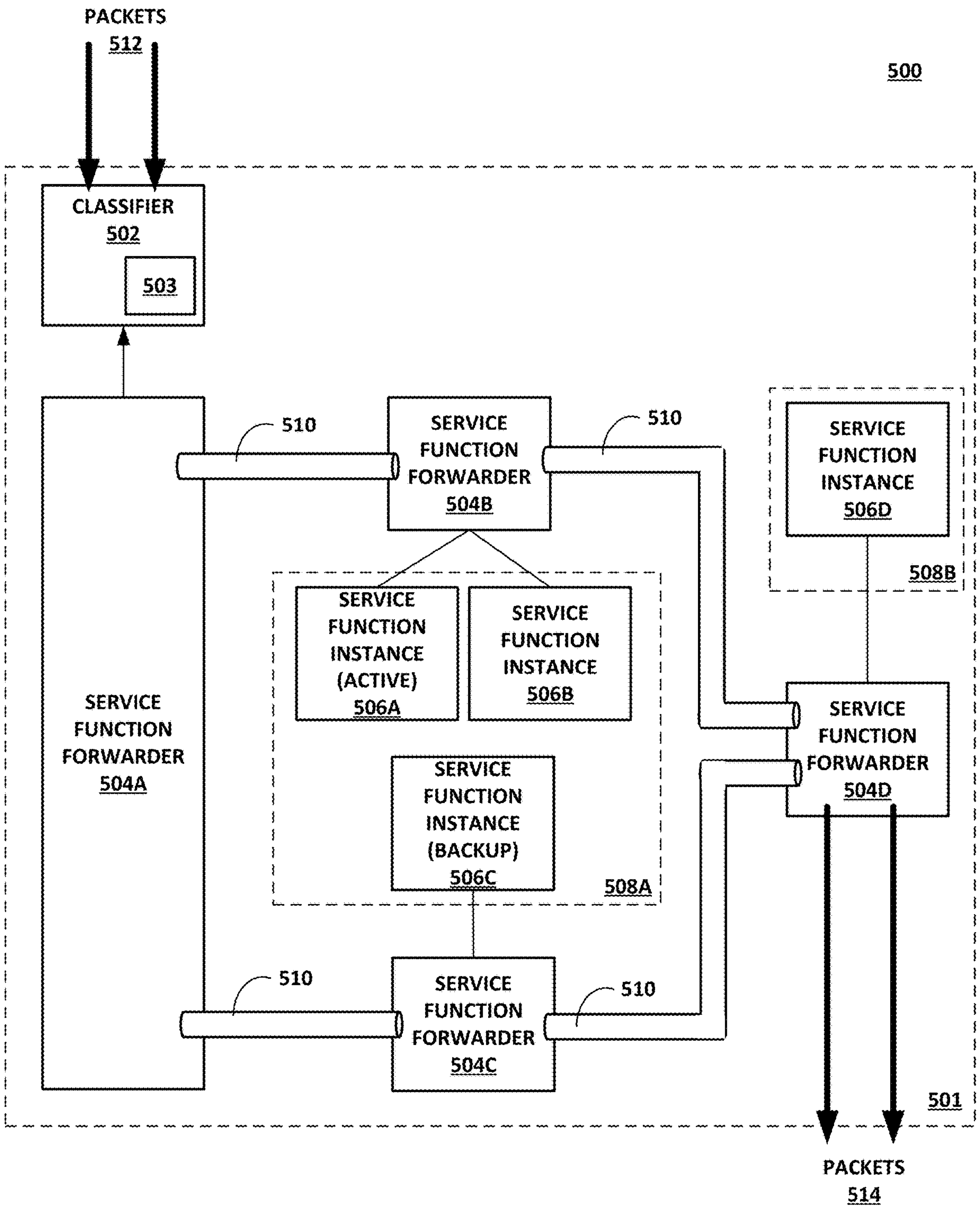
FIG. 5 is a block diagram illustrating an example service function chaining architecture reference model, according to the techniques described in this disclosure.

FIG. 5 is a block diagram illustrating an example service function chaining architecture reference model, according to techniques described herein. In this example, service function overlay network 501 operates over a physical underlay network of interconnected computing devices each providing an operating environment for one or more service function forwarders 504A-504D. Each of service function forwarders 504 may represent an example instance of service function forwarder 222 or any service function forwarder described herein. Tunnels 510 connect pairs of service function forwarders 504 over the underlay network.

Service function overlay network 501 includes service function instances 506A-506D (collectively, "service function instances 506") and classifier 502, which may also represent a service function instance. Each of service function instances 506 and classifier 502 is hosted or otherwise local to one of service function forwarders 504. For example, service function instances 506A, 506B are local to service function forwarder 504B and service function instance 506D is local to service function forwarder 504D. Service function instances 506 may have a different service function type 508. For example, service function instances 506A, 506B, and 506C all have service function type 508A, while service function instance 506D has a different service function type 508B.

Service function overlay network 501 is merely one example. Examples of service function overlay network 501 may have any number of service function forwarders 504, service function instances 506, and may be arranged in various overlay topologies as determined by the configuration of tunnel interfaces for tunnels 510.

Packets 512 ingress at classifier 502, which classifies each packet to a service function chain of one or more service function instances 506. Service function forwarders 504 exchange service function chain routes and service function instance routes as described elsewhere herein. Service function forwarders 504 select a next service function instance 506 and forward each classified packet along its service function chain via tunnels 510 to the next hop service function forwarder 504 that is local for the next service function instance 506, via tunnels 510. Once the last service function instance 506D in the service function chain processes the packets, the last service function forwarder 504D may egress the processed packets 514 from the service function overlay network 501 to their respective destinations.

In the example of FIG. 5, a service function chain may include service function instance 506A and a next hop of service function instance 506D. That is, service function instance 506A and service function instance 506D are active service functions of the service function chain. Service function instance 506C may operate as a backup service function for service function instance 506A of the service function chain.

Classifier 502 receives packets 512 and classifies the packet to a service function chain. Classifier 502 may determine one or more backup service functions for active service functions of the service function chain. For example, classifier 502 may determine that service function instance 506C may operate as a backup service function for service function instance 506A. Classifier 502 encapsulates packets 512 with a network service header including a service path identifier, a service index, and backup service function information. As described in this disclosure, the backup service function information 503 (e.g., backup service information stored in table 30 of FIG. 1) may include, for example, one or more network addresses of computing devices that host the backup service functions. In this example, the network service header includes a network address of service function forwarder 504C that hosts backup service function instance 506C and forwards the packet to service function forwarder 504B, which will forward the packet to the service function next hop, e.g., service function instance 506A. In response to receiving the packet, service function forwarder 504B may decapsulate the network service header from the packet and sends the packet to service function instance 506A. Service function forwarder 504B may also identify, based on the backup service function information included in the network service header, that service function forwarder 504C hosts backup service function instance 506C. Service function forwarder 504B may inform service function instance 506A that service function forwarder 504C hosts backup service function instance 506C. In response, service function instance 506A may send the state information to service function forwarder 504C that hosts service function instance 506C to synchronize its state information with backup service function instance 506C.

Figure 6:
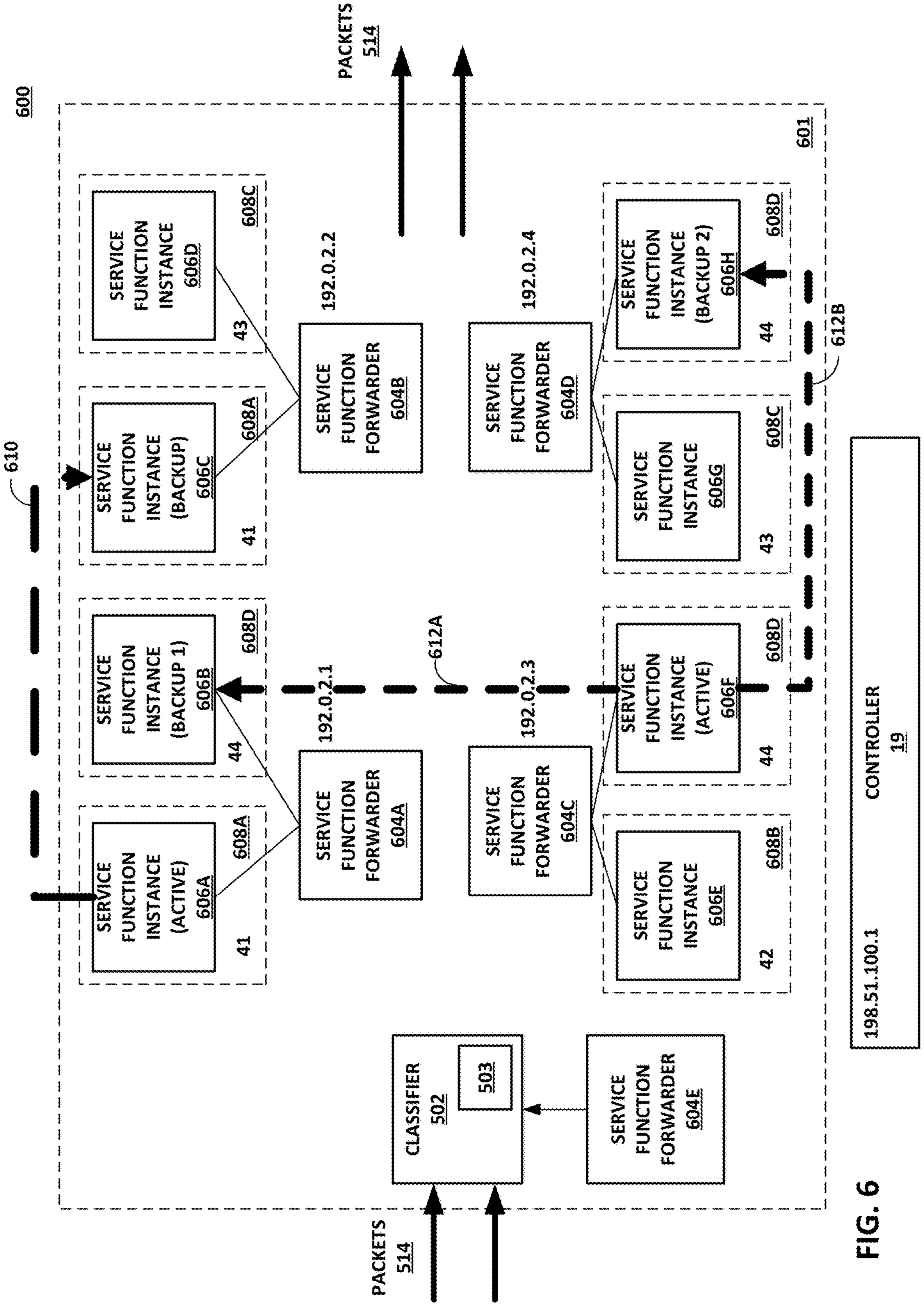
FIG. 6 is a block diagram illustrating an example service function overlay network, in accordance with the techniques described in this disclosure.

FIG. 6 is a block diagram illustrating an example service function overlay network, according to techniques described herein. Service function overlay network 601 may be an example instance of service function overlay network 501. In this example, service function overlay network 601 includes service function forwarders 604, service function instances 606, classifier 502, and is managed by controller 19. Tunnels are not shown for ease of illustration. Each service function instance 606 has a corresponding service function type 608 value that is illustrated in FIG. 6. For example, the service function type 608A value is 41 and is shared by service function instances 606A, 606C, the service function type 608B value is 42 and is provided by service function instance 606E, the service function type 608C value is 43 and is shared by service function instances 606D, 606G, and the service function type 608D value is 44 and is shared by service function instances 606B, 606F, and 606H.

Each of service function forwarders 604A-604D has a corresponding network address illustrated in FIG. 6. Although illustrated and described with respect to an IPv4 address, other types of network addresses are contemplated, e.g., IPv6. For instance, service function forwarder 604A has IP address 192.0.2.1, service function forwarder 604B has IP address 192.0.2.2, service function forwarder 604C has IP address 192.0.2.3, and service function forwarder has IP address 192.0.2.4. Service function forwarder 604A provides access to service function instances 606A, 606B. Service function forwarder 604B provides access to service function instances 606C, 606D. Service function forwarder 604C provides access to service function instances 606E, 606F. Service function forwarder 604D provides access to service function instances 606G, 606H. Service function forwarder 604E provides access to classifier 502. Controller 19 has IP address 198.51.100.1.

Each of service function forwarders 604 advertise routes to the service function instances 606 it provides access to. The following are example service function instance routes for service function instances 606:

RD=192.0.2.1,1, SFT=41 [606A]
RD=192.0.2.1,2, SFT=44 [606B]
RD=192.0.2.2,1, SFT=41 [606C]
RD=192.0.2.2,2, SFT=43 [606D]
RD=192.0.2.3,7, SFT=42 [606E]
RD=192.0.2.3,8, SFT=44 [606F]
RD=192.0.2.4,5, SFT=43 [606G]
RD=192.0.2.4,6, SFT=44 [606H]

Route distinguisher (RD) is an example of a service distinguisher and includes the IP address of the advertising host and another value, and SFT is the service function type for the service function instance being advertised. Addressing used for communicating between service function forwarders 604 is taken from the Tunnel Encapsulation attribute of the service function instance route and not from the RDs of the route.

A service function chain route may define an explicit service function chain (i.e., defines a specific service function next hop), a service function chain that provides a choice of service function instances (i.e., defines a choice of next hop service function forwarder to execute the next hop in the chain), a service function chain with an open choice of service function instances (e.g., defines a choice of next hop service function forwarder that support service functions of a particular service function type), a service function chain with a choice of service function types, correlated bidirectional service function chains, correlated bidirectional and asymmetrical service function chains, asymmetric bidirectional service function chains, a service chain to provide looping, jumping, or branching.

The following is an example of a service function chain. Consider the following service function chain route:

SFC1: RD=198.51.100.1,101, SPI=15, [SI=255, SFT=41, RD=192.0.2.1,1], [SI=250, SFT=43, RD=192.0.2.2,2]

The service function chain for SFC1 consists of a service function of type 41 located at service function forwarder 604A followed by a service function of type 43 located at service function forwarder 604B. In one example, classifier 502 may receive a packet of packets 514 that is classified to SFC1. Classifier 502 determines backup service function information for the active service functions of SFC1. For example, service function instance 606C may operate as a backup service function for service function instance 606A of type 608A having value 41. In this example, backup service function information 503 may specify an active service function next hop with a network address of service function forwarder 604A (e.g., RD=192.0.2.1,1) and a backup service function next hop with a network address of service function forwarder 604B (e.g., RD=192.0.2.2,1) that hosts backup service function instance 606C.

Classifier 502 sends the packet on the chain to service function forwarder 604A, the packet including a network service header specifying a service path identifier (SPI) (value=15), a service index of 255, and the backup service function information, as provided below:

[SFI=15, SI=255, Active SF RD=192.0.2.1,1, Backup SF RD=192.0.2.2,1]

Service function forwarder 604A may receive the packet encapsulated with the network service header including the backup service function information and identifies the service function chain from the SPI and service index. Service function forwarder 604A determines that for initial service index 255, service function forwarder 604A is to deliver the packet to the service function instance 606A having service function type 608A with value 41. Service function forwarder 604A also determines that for initial service index 255, service function forwarder 604B provides access to the backup service function instance 606C. Service function forwarder 604A delivers the packet to the service function instance 606A having service function type 608A with value 41. Service function forwarder 604A may also inform service function instance 606A the location of its backup service function instance. Service function instance 606A may send its state information (illustrated in FIG. 6 as 610) to service function forwarder 604B that hosts service function instance 606C to synchronize state information with service function instance 606C.

When the packets are returned to service function forwarder 604A by the service function instance 606A, the service index will be decreased to 250 for the next hop. Service function forwarder 604A forwards the packet to service function forwarder 604B, which will send the packets to the service function instance 606D having service function type 608C with value 43 before forwarding the packets to their destinations. Service function forwarder 604B determines that for service index 250, service function forwarder 604B is to deliver the packet to the service function instance 606D having service function type 608C with value 43.

In some examples, an active service function may have a plurality of backup service functions. Consider the following example service function chain route:

SFC2: RD=198.51.100.1,101, SPI=16, [SI=255, SFT=41, RD=192.0.2.1,1], [SI=250, SFT=44, RD=192.0.2.3,7]

The service function chain for SFC2 consists of a service function of type 41 located at service function forwarder 604A followed by a service function of type 44 located at service function forwarder 604C. In one example, classifier 502 may receive a packet of packets 514 that is classified to SFC2. Classifier 502 determines backup service function information for the active service functions of SFC2. For example, service function instance 606B and service function instance 606H may each operate as a backup service function for service function instance 606F of type 608B having value 44. In this example, backup service function information 503 may specify an active service function next hop with a network address of service function forwarder 604C (e.g., RD=192.0.2.3,7) and a first backup service function next hop with a network address of service function forwarder 604A (e.g., RD=192.0.2.1,2) and a second backup service function next hop with a network address of service function forwarder 604D (e.g., RD=192.0.2.4,6).

Classifier 502 sends the packet on the chain to service function forwarder 604A, the packet including a network service header specifying a service path identifier (SPI) (value=16), a service index of 250, and the backup service function information, as provided below:

[SFI=16, SI=250, Active SF RD=192.0.2.2.3,7, Backup SF RD=192.0.2.1,2; 192.0.2.4,6]

Service function forwarder 604A may receive the packet encapsulated with the network service header including the backup service function information and identifies the service function chain from the SPI and service index. Service function forwarder 604A determines that for initial service index 255, service function forwarder 604A is to deliver the packet to the service function instance 606A having service function type 608A with value 41. When the packets are returned to service function forwarder 604A by the service function instance 606A the service index will be decreased to 250 for the next hop. Service function forwarder 604A forwards the packet to service function forwarder 604C, which will send the packets to the service function instance 606F having service function type 608D with value 44 before forwarding the packets to their destinations. Service function forwarder 604C may also inform service function instance 606F the location of its backup service function instances, e.g., service function forwarder 604A (e.g., 192.0.2.1,2) and service function forwarder 604D (e.g., 192.0.2.4,6). Service function instance 606F may send its state information (illustrated in FIG. 6 as 612A) to service function forwarder 604A that hosts service function instance 606B to synchronize state information with service function instance 606B. Similarly, service function instance 606F may send its state information (illustrated in FIG. 6 as 612B) to service function forwarder 604D that hosts service function instance 606H to synchronize state information with service function instance 606H.

Figure 7:
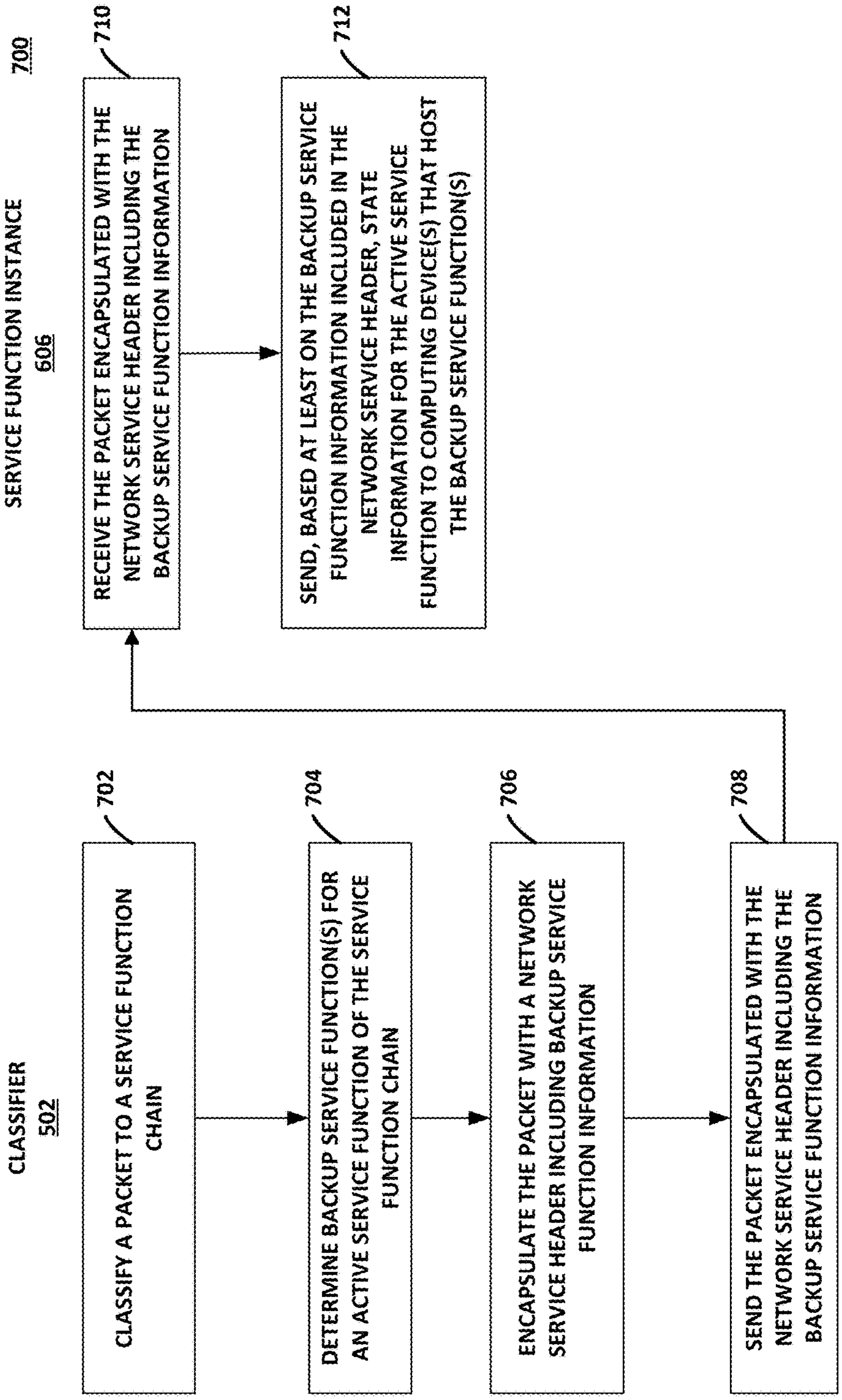
FIG. 7 is a flowchart illustrating an example mode of operation, in accordance to techniques described in this disclosure.

FIG. 7 is a flowchart illustrating an example mode of operation, in according to techniques of this disclosure. Operation 700 is described with respect to FIG. 6. Operation 700 is also described with respect to computing device 200 of FIG. 2 but may be performed by any computing or network device.

Classifier 502 may receive a packet (e.g., of packets 514) and classifies the packet to a service function chain (702). For example, computer device 200, operating as classifier 502, may match the packet to policies that each specifies a service path identifier that identifies a given service function chain. As one example, classifier 502 receives a service function chain route for SFC1 of FIG. 6. In response to receiving a packet, classifier 502 may apply the policies to packet header fields (e.g., 5-tuple values) of the packet to determine a service function chain (e.g., SFC1 of FIG. 6) is applied to the packet. As described above, SFC1 may identify a service function chain including service function instance 606A followed by service function instance 606D.

Classifier 502 determines one or more backup service functions for an active service function of the service function chain (704). For example, classifier 502 may perform a lookup of a table including backup service function information (e.g., backup service function information 503 of FIG. 6) and determine the location of backup service functions for service function instance 606A and service function instance 606D. In this example, backup service function information 503 may specify an active service function next hop with a network address of service function forwarder 604A (e.g., RD=192.0.2.1,1) and a backup service function next hop with a network address of service function forwarder 604B (e.g., RD=192.0.2.2,1). Backup service function information 503 may also specify an active service function next hop with a network address of service function forwarder 604B (e.g., RD=192.0.2.2,2) and a backup service function next hop with a network address of service function forwarder 604D (e.g., RD=192.0.2.4,5).

To realize the service path, classifier 502 encapsulates the packet with a network service header including a service path identifier for the service function chain (e.g., SPI=15) and a service index (SI=255) for the first hop in the selected service function chain. In accordance with the techniques described in this disclosure, classifier 502 further includes backup service function information in the network service header (706). For example, classifier 502 includes a network address of computing devices that host the backup service function instances. For instance, a packet classified to SFC1 is encapsulated with a network service header including a service path identifier of 15, a service index of 255, and a network address of service function forwarder 604B to indicate the location of the backup service function instance 606D for active service function instance 606A.

Classifier 502 sends the packet encapsulated with the network service header including the backup service function information to the first service function instance (e.g., service function instance 606A) in the service chain (708). For example, classifier 502 sends the packet to service function forwarder 604A, which will deliver the packet to service function instance 606A in the service chain.

Service function instance 606A may receive the packet encapsulated with the network service header including the backup service function information (710) and sends, based at least on the backup service function information included in the network service header, state information for the active service function to the computing devices that host the one or more backup service functions (712). For example, service function instance 606A may identify the service chain from service path identifier of 15, and the one or more computing devices that host the one or more backup service functions specified in variable-length context headers of the network service header.

Service function instance 606A may send state information to the one or more computing devices that host the one or more backup service functions (712). In this example, service function instance 606A (e.g., the active service function) may send state information to service function instance 606D (e.g., the backup service function).

Although not illustrated in FIG. 7, each service function next hop may receive the packet encapsulated with the network service header including the backup service function information, and synchronize its session state with computing devices identified from the backup service function information. For example, classifier 502 may send another packet encapsulated with a network service header including a service path identifier for the service function chain (e.g., SPI=15) and a service index (SI=250) for the second service function instance in the selected service chain, and backup service information to enable the computing device that hosts the second service function instance in the service chain to synchronize, based at least on the backup service function information, state information with the one or more backup service functions identified from the backup service function information.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:

receiving, by a computing device that hosts an active service function of a service function chain, a packet of a packet flow classified to the service function chain, wherein the packet is encapsulated with a network service header that includes backup service function information that identifies one or more computing devices that host one or more backup service functions for the active service function; and based at least on the backup service function information included in the network service header, sending, by the computing device that hosts the active service function and to the one or more computing devices identified by the backup service function information, state information for a session of the active service function to enable the one or more backup service functions to assume stateful processing of packets of the packet flow.

2. The method of claim 1, wherein the backup service function information comprises one or more network addresses of the one or more computing devices that host the one or more backup service functions, the method further comprising:

identifying, by the computing device that hosts the active service function and based at least on the backup service function information included in the network service header, the one or more computing devices that host the one or more backup service functions for the active service function of the service function chain.

3. The method of claim 1, wherein the backup service function information is specified as one or more variable-length context headers of the network service header.

4. The method of claim 3, wherein the network service header includes a value for a metadata type that indicates the network service header includes backup service function information specified as one or more variable-length context headers.

5. A method comprising:

classifying, by a service function classifier, a packet of a packet flow to a service function chain;

determining, by the service function classifier, one or more backup service functions for an active service function of the service function chain;

encapsulating, by the classifier, the packet with a network service header, wherein the network service header includes backup service function information that identifies one or more computing devices that host the one or more backup service functions; and sending, by the classifier, the packet encapsulated with the network service header to a computing device that hosts the active service function in the service function chain to enable the computing device that hosts the active service function to send, based at least on the backup service function information, state information for a session of the active service function to the one or more computing devices that host the one or more backup service functions to enable the one or more backup service functions to assume stateful processing of packets of the packet flow.

6. The method of claim 5, wherein the backup service function information comprises one or more network addresses of the one or more computing devices that host the one or more backup service functions.

7. The method of claim 5, wherein the backup service function information is specified as one or more variable-length context headers of the network service header.

8. The method of claim 7, wherein the network service header includes a value for a metadata type that indicates the network service header includes backup service function information specified as one or more variable-length context headers.

9. The method of claim 5, wherein determining one or more backup service functions for the active service function of the service function chain comprises:

performing, by the classifier, a lookup of a table comprising one or more network addresses of the one or more computing devices that host the one or more backup service functions.

10. The method of claim 9, wherein the table further comprises:

a service path identifier for the service function chain;

a service index providing a location of the active service function within the service function chain; and a network address of the computing device that hosts the active service function.

11. The method of claim 5, wherein the one or more backup service functions comprises a first one or more backup service functions, wherein the packet comprises a first packet encapsulated with a first network service header including first backup service function information, the method further comprising:

classifying, by the service function classifier, a second packet to the service function chain;

determining, by the service function classifier, a second one or more backup service functions for the active service function of the service function chain, wherein the second one or more backup service functions are different than the first one or more backup service functions;

encapsulating, by the classifier, the second packet with a second network service header, wherein the second network service header includes second backup service function information that identifies one or more computing devices that host the second one or more backup service functions with which the computing device that hosts the active service function is to synchronize state information; and sending, by the classifier, the second packet encapsulated with the second network service header to the computing device that hosts the active service function in the service function chain to enable the computing device that hosts the active service function to send, based at least on the second backup service function information, state information for the active service function to the one or more computing devices that host the second one or more backup service functions.

12. A network system comprising:

a plurality of service functions; and a computing device comprising a service function classifier configured to:

classify a packet of a packet flow classified to a service function chain including the plurality of service functions;

determine one or more backup service functions for an active service function of the service function chain;

encapsulate the packet with a network service header, wherein the network service header includes backup service function information that identifies one or more computing devices that host the one or more backup service functions; and send the packet encapsulated with the network service header to a computing device that hosts the active service function in the service function chain to enable the computing device that hosts the active service function to send, based at least on the backup service function information, state information for a session of the active service function to the one or more computing devices that host the one or more backup service functions to enable the one or more backup service functions to assume stateful processing of packets of the packet flow.

13. The network system of claim 12, wherein the computing device that hosts the active service function is configured to:

receive the packet encapsulated with the network service header; and send, based at least on the backup service function information included in the network service header, state information to the one or more computing devices that host the one or more backup service functions.

14. The network system of claim 12, wherein the backup service function information comprises one or more network addresses of the one or more computing devices that host the one or more backup service functions, wherein the computing device is further configured to:

identify, based at least on the backup service function information included in the network service header, the one or more computing devices that host the one or more backup service functions for the active service function of the service function chain.

15. The network system of claim 12, wherein the backup service function information comprises one or more network addresses of the one or more computing devices that host the one or more backup service functions.

16. The network system of claim 12, wherein the backup service function information is specified as one or more variable-length context headers of the network service header.

17. The network system of claim 16, wherein the network service header includes a value for a metadata type that indicates the network service header includes backup service function information specified as one or more variable-length context headers.

18. The network system of claim 12, wherein, to determine one or more backup service functions for the active service function of the service function chain, the service function classifier is configured to:

perform a lookup of a table comprising one or more network addresses of the one or more computing devices that host the one or more backup service functions.

19. The network system of claim 18, wherein the table further comprises:

a service path identifier for the service function chain;

a service index providing a location of the active service function within the service function chain; and a network address of the computing device that hosts the active service function.

20. The network system of claim 12, wherein the one or more backup service functions comprises a first one or more backup service functions, wherein the packet comprises a first packet encapsulated with a first network service header including first backup service function information, the service function classifier further configured to:

classify a second packet to the service function chain;

determine a second one or more backup service functions for the active service function of the service function chain, wherein the second one or more backup service functions are different than the first one or more backup service functions;

encapsulate the second packet with a second network service header, wherein the second network service header includes second backup service function information that identifies one or more computing devices that host the second one or more backup service functions with which the computing device that hosts the active service function is to synchronize state information; and send the second packet encapsulated with the second network service header to the computing device that hosts the active service function in the service function chain to enable the computing device that hosts the active service function to send, based at least on the second backup service function information, state information for the active service function to the one or more computing devices that host the second one or more backup service functions.

* * * * *